Patented Aug. 12, 1924.

1,504,671

UNITED STATES PATENT OFFICE.

JOSEPH BLUMENFELD, OF LONDON, ENGLAND.

TITANIUM COMPOUND.

No Drawing. Application filed July 17, 1923. Serial No. 652,188.

*To all whom it may concern:*

Be it known that I, JOSEPH BLUMENFELD, a citizen of the Russian Realm, and residing at 16 Addison Crescent, London, W. 14, England, have invented certain new and useful Improvements Relating to Titanium Compounds, of which the following is a specification.

This invention relates to the manufacture of commercial titanium oxide, i. e., pure enough for many industrial purposes, from titanium containing minerals, e. g., ilmenite.

The processes hitherto proposed for the treatment of the mass resulting from the action of sulphuric acid on the mineral are based on the principle or idea that the titanium compounds are converted into the liquid phase in the form of a mixture of neutral and basic sulphates together with titanium oxide in a colloidal form. Such treatment involves three operations:—

(a) The liquid phase resulting from the decomposition by sulphuric acid is separated from the unattacked mineral by filtration or by decantation. Subsequently (b), the same liquid phase is freed from part of the iron compounds by crystallization of the sulphate of iron and thus one obtains a solution suited for (c) the hydrolytic treatment in the most favourable condition for the production of pure titanium oxide.

The following four difficulties or disadvantages are, however, inherent in such methods of working:

1. To obtain a good recovery of titanium compounds which can be rendered soluble by treatment with water it is necessary to prevent overheating, but the surface of contact with liquids is small and the operation slow, while the crystallization of sulphate of iron (scarcely soluble in the cold and but sparingly soluble hot) is an obstacle to obtaining a concentrated solution at the desired low temperatures.

2. The impurities of the mineral and presence of a certain quantity of a titanium compound which is obtained as a result of the decomposition in a scarcely soluble form makes filtration or decantation very difficult and tedious if not impossible.

3. When the sulphate of iron is crystallized the purification of this salt with the recovery of the titanium compounds contained in the mother liquor forms a separate operation.

4. Such processes entail the handling of large volumes of liquid.

The object of the present invention is to obtain the separation of the titanium compounds in a simple and rapid manner and avoid the difficulties or disadvantages set out above.

The invention consists in treating the mass resulting from the decomposition of the mineral with sulphuric acid, with a limited quantity of water while maintaining the mass at an approximately constant temperature near to the boiling point of the liquid until the titanium oxide is precipitated; at the same time care should be taken that any iron in solution is present as a ferrous salt.

The invention also consists in recovery of the iron contained in the mineral (together with such iron as may be utilized in a metallic state to reduce the solution) by crystallizing the ferrous sulphate from the mother liquor from which the major portion of the titanium has already been eliminated, thus rendering the purification of the ferrous sulphate very simple.

The invention further consists in the recovery of about 90 per cent of the sulphuric acid employed for the decomposition partly in the form of sulphate of iron and partly as free acid.

The invention also consists in conducting the reaction under the protection of a relatively nonvolatile inert liquid layer on the surface of the liquid so as to minimize evaporation and thus save fuel.

In carrying the invention into effect generally the product resulting from the action of sulphuric acid on the mineral is treated, preferably in place, with a certain quantity of water. The mixture is maintained at a constant temperature near to the boiling point until one obtains the oxide of titanium precipitated with the recovery of 85 to 94 per cent of the oxide present in a form in which it is readily filtrable.

During the operation metallic iron is added which reduces the ferric sulphate which has been formed during the decomposition. The operation finished, filtering may be carried out either hot or after cooling and the precipitated oxide is separated from the mineral residue either by decantation or by levigation. In this manner three fractions are obtained.

1. The mineral which has not been decomposed.
2. An oxide of titanium containing less than 1 per cent of fixed impurities.
3. A solution of ferrous sulphate in sulphuric acid which easily yields on cooling crystals of hydrated ferrous sulphate. These crystals can be easily purified. The residual solution of sulphuric acid may then be concentrated to the degree of strength required for further operations.

In carrying the invention into effect more specifically, by way of example, I take, say, 1 kilo of ilmenite in finely divided form after separation of such impurities as may be removable by mechanical, electrostatic or magnetic means. To this ilmenite is added 1 kilo of strong sulphuric acid, say 95 to 96 per cent strength, and 200 cubic cms. of water with stirring from time to time.

It will be noted that 1000 grams of $H_2SO_4$ of 95% plus 200 grams of water, forms 1200 grams of a more dilute acid, which will be about 79.2% strength (60.5 Bé., or 1.723 sp. g.) Likewise 1000 grams of 96% $H_2SO_4$ plus 200 grams of water forms 1200 grams of a sulphuric acid of 80% strength (61° Bé. or 1.733 sp. g.) Heat is of course liberated by mixing the strong acid (95–96%) with water.

The mass is heated to 160° C. until the reaction is complete and the reaction generally takes a few hours, according to the mineral treated.

When the reaction has been completed a limited quantity, say three litres, of water is gradually added, preferably with agitation, adding also finely divided metallic iron to reduce the ferric salts. This gradual addition is of importance as affecting the hydrolysis. A portion of this water may be introduced in the form of water of crystallization contained in hydrated ferrous sulphate which increases the concentration of the solution and hence reduces the subsequent evaporation required. The temperature of the operation is maintained near the boiling point and the volume kept constant by the layer of paraffin preventing evaporation.

This is best carried out with the minimum loss of heat if evaporation is prevented. For this purpose a cover of a low melting inert substance, which is less dense than the liquid, is placed on its surface. This covering substance must not enter into the reaction with the liquid and practically must not be volatile as, for example, paraffin, petrolatum, oil and the like.

The mass breaks up quicker if the boiling point is raised by the addition of sulphate of iron. The oxide of titanium is precipitated on boiling and after two or three hours of digesting is converted into an easily filtrable form.

The solution together with the precipitate is decanted hot while the mineral which escaped the decomposition sinks rapidly to the bottom of the vessel. The decanted portion is then filtered and the precipitate is washed by water. The following is obtained:

(1) 350–400 grms. of unattacked ilmenite which is returned to be added to the next batch.

(2) 4 litres of solution which contains:—
250 grms. per litre $H_2SO_4$ (a part of which is in the form of free acid).
5.15 grms. per litre $TiO_2$.
50–60 grms. per litre Fe.

(3) 600–700 grms. of precipitate which contains:—
45 per cent of $TiO_2$,
4–8 per cent of $H_2SO_4$, and say
0.10 per cent of Fe.

The sulphuric acid which can be recuperated (partly as free acid and partly as sulfate) in the mother liquor amounts to 92 to 96 per cent of the amount used.

Practically 100 per cent of the iron can be recovered.

70 to 85 or 90 per cent of $TiO_2$ can be obtained in solid form; 30 to 15 or 10 per cent remains in the mother liquor, which is returned to the new batch with the sulphuric acid as above and is thus eventually recovered. In this way, practically all of the $TiO_2$ in the ore is obtained in the desired form.

I may also proceed in a modified way, using the theoretical quantity of acid necessary for the decomposition of a given quantity of mineral and not less as described above. In this case the time necessary for the reaction is longer but all the mineral is acted on and the levigation step is avoided.

Having now described my invention, what I claim as new and desire to secure by Letters Patent is:—

1. A process of producing titanium oxide from titaniferous mineral consisting in decomposing the mineral with not substantially more than 1—2 parts of sulphuric acid of about 80% strength, and treating the resulting mass with not substantially over 3 parts of water, while maintaining the mass at an approximately constant temperature near to the boiling point of the liquid until the titanium oxide is precipitated, while any iron compound in the solution is maintained in the ferrous state, and separating the oxide from the mother liquor and residue, substantially as described.

2. In a process as claimed in claim 1, introducing part of the specified quantity of water in the form of water of crystallization as hydrated ferrous sulphate, substantially as described.

3. In a process as claimed in claim 1, maintaining the volume of the heated reaction mass approximately constant by floating thereon an inert liquid layer, substantially as described.

4. In the precipitation of titanium compounds by hydrolysis of the sulfate in the presence of water, the steps of maintaining the mass at slightly below its boiling point while maintaining a layer of inert substantially non-volatile liquid upon the surface thereof.

5. The herein described process of treating the residue resulting from heating titanium ore with sulfuric acid, said residue containing a substantial amount of undecomposed ore, which comprises adding directly thereto not substantially over three equivalents of water and a reducing agent capable of reducing all ferric compounds therein, and maintaining the mass at near to but below its boiling point and agitating until the bulk of the titanium sulfate has been hydrolyzed and decanting the mixture of liquid and precipitate from the residue of undecomposed ore.

6. In the treatment of ilmenite ore, the step of heating to about 160° C., by extraneous heat application, a mixture of ilmenite ore and sulfuric acid of about 80% strength, until the reaction is substantially complete.

In testimony whereof I have signed my name to this specification.

JOSEPH BLUMENFELD.